3,535,343
PROCESS FOR THE PREPARATION OF BENZOIC ACID LACTONES AND NOVEL INTERMEDIATES THEREFOR
Alexander D. Cross, Mexico City, Mexico, and John H. Fried and Ian T. Harrison, Palo Alto, Calif., assignors to Syntex Corporation, Panama, Panama, a corporation of Panama
No Drawing. Filed Aug. 30, 1966, Ser. No. 575,947
Int. Cl. C07d 9/00
U.S. Cl. 260—343.2    14 Claims

ABSTRACT OF THE DISCLOSURE

Process for preparation of 2 - [6' - keto - 10' - hydroxyalk - 1' - enyl] - 4,6 - bistetrahydropyran - 2' - yloxy benzoic acid - 10' - lactones and 4,6 - dihydroxy derivatives thereof by treating the corresponding 2 - [2' - hyroxy-2' - (4 - acyloxyalkyl) - 6' - p - toluenesulfonyloxy- ((or -bromo-, or -chloro-))cyclohexyl]-4,6-bistetrahydropyran-2"-yloxy benzoic with base; the latter is prepared from a 3,5-bisbenzyloxyphenylacetate ester.

---

This invention relates to a process for the preparation of organic compounds and to certain novel intermediates thereof.

More particularly, this invention is directed at the novel synthesis of benzoic acid lactones represented by the following skeletal formula:

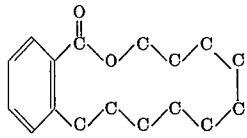

The compounds of this invention demonstrate hormonal properties characteristic of estrogenic agents and are thus useful in the treatment of estrogen deficiencies, in fertility regulation and in the management of various menstrual disorders.

These compounds are also active anabolic agents and are thus useful in the treatment of debilatory conditions, such as are encountered in advanced age, post-operative recuperation, and the like. They are useful as a supplement in livestock feeds to increase consumption with resultant fattening and improved appearance. In addition, the compounds of this invention possess antibiotic, antifungal, and other activities usually associated with certain synthetic or naturally occurring derivatives.

The benzoic acid lactones represented by the above skeletal formula are prepared in accordance herewith via a sequence of steps from a phenylacetate ester.

In the practice of the principal preferred aspects of this process, the starting phenylacetate ester is reacted with a glutaric acid ester giving the bicyclic-diketo adduct therebetween and then a mono-alkyl enol ether thereof is formed. Thereafter, the remaining keto function of the mono-enol ether is converted by treatment with an etherified alkyl lithium to the corresponding etherified alkyl-hydroxy compound. An intermediate tricyclic lactone of this latter compound is prepared and is, in turn, converted by sequence of steps to the corresponding tricyclic lactone tosylate or other appropriate leaving group containing derivative. This latter derivative is thereafter rearranged to the product benzoic acid lactone, which can contain bisether functions on the phenyl ring, upon treatment with base. This novel step is described in more detail hereinafter. The lactone thus obtained is thereafter hydrolyzed with acid cleaving any ether functions present to give the corresponding lactone containing free hydroxyl groups.

A representative class of the above depicted and described benzoic acid lactones is typified by Formula I as follows:

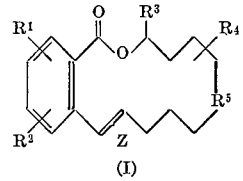

wherein each of $R^1$ and $R^2$, independent of each other, is hydrogen, hydroxy, alkoxy, halo, cyclopentyloxy, tetrahydrofuran-2' - yloxy, tetrahydropyran - 2' - yloxy, hydrocarbon carboxylic acyl or acyloxy of less than 12 carbon atoms or when taken together, 4,5-benzo;
$R^3$ is hydrogen or (lower)alkyl;
$R^4$ is halo or the group $(C_nH_{2n})$—H which $n$ has a value of from 0 to 6;
$R^5$ is one of groups >$CH_2$, >$C=O$, >$CF_2$, >CH, ≥CH

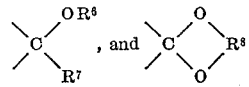

in which $R^6$ is hydrogen, cyclopentyl, tetrahydrofuran-2'-yl, tetrahydropyran - 2' - yl, or hydrocarbon carboxylic acyl of less than 12 carbon atoms; $R^7$ is hydrogen, (lower)alkyl, (lower)alkenyl, (lower)alkynyl, or halo(lower)alkynyl; and $R^8$ is methylene, 1,2 - propylene, or trimethylene; and Z is a carbon-carbon single bond or a carbon-carbon double bond.

By practicing the novel process of this invention according to preferred conditions, a representative class of product benzoic acid lactones is prepared which is typified below by Formula Ia:

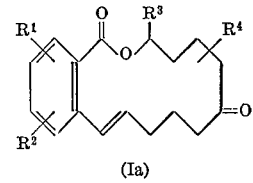

wherein each of $R^1$, $R^2$, $R^3$, and $R^4$ is as hereinbefore set forth. In the above definitions, each of $R^1$ and $R^2$ is hydrogen, hydroxy, halo, or when taken together, 4,5-benzo, after the terminal acid hydrolysis step mentioned above has been performed upon the product lactones.

By the term "(lower)alkyl," "(lower)alkenyl," "(lower)alkynyl," and "halo(lower)alkynyl" are intended branched or straight chain hydrocarbon groups of six or less carbon atoms. Representations of such (lower)alkyl groups are thus methyl, ethyl, propyl, butyl, pentyl, and hexyl; of such (lower)alkynyl groups are ethynyl, propynyl, and the like; and of such halo(lower)alkynyl groups are chloroethynyl, and the like.

Hydrocarbon carboxylic acyl and acyloxy groups of the present invention will contain less than 12 carbon atoms and may be of a straight, branched, cyclic or cyclic-aliphatic chain structure. These may be saturated, unsaturated or aromatic and optionally substituted by functional groups, such as hydroxy, alkoxy containing up to 5 carbon atoms, acyloxy containing up to 12 carbon atoms, nitro, amino, halogeno, and the like. Typical esters thus including acetate, propionate, enanthate, benzoate, trimethylacetate, t-butylacetate, phenoxyacetate, cyclopentylpropionate, aminoacetate, β-chloropropionate, adamantoate, and the like.

One particularly valuable compound of those represented by Formula I above is 2-(6'-keto-10'-hydroxyundec-1'-enyl)-4,6-dihydroxybenzoic acid-10'-lactone represented hereinafter by structural Formula IX. This compound can be prepared by a preferred practice of the instant process according to the following general reaction scheme in which the principal reactions are set forth.

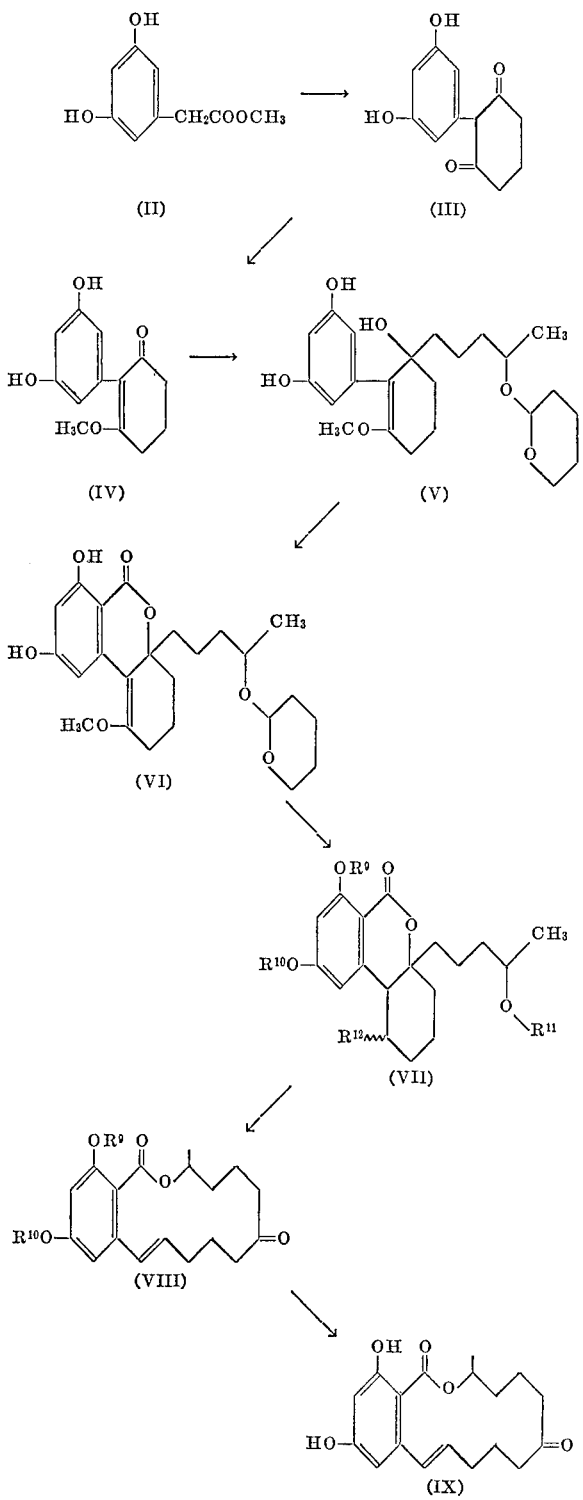

wherein each of $R^9$ and $R^{10}$ is an ether group, such as tetrahydropyranyloxy, tetrahydrofuranyloxy, and the like, $R^{11}$ is hydrocarbon carboxylic acyl containing less than 12 carbon atoms and $R^{12}$ is bromo, chloro, or p-toluenesulfonyloxy.

With reference to the above scheme, compound (II) is dietherified such as with benzyl chloride in the presence of sodium hydride to give the 3,5-bisbenzyloxyphenylacetate. This ester is then condensed with a glutaric acid ester such as ethyl glutarate followed by the addition of base giving the bicyclic-diketo adduct (III). The thus prepared adduct is hydrogenated with nickel catalyst to remove the bisbenzyloxy ether groups, and the resultate dihydroxy compound treated with a (lower)alkanol in the presence of acid to give the monoalkyl enol ether (IV).

Thereafter, the thus prepared mono-enol ether is treated with 4-tetrahydropyran-2'-yloxypentyl lithium or other alkali metal etherified alkane to give the etherified alkylhydroxy compound (V). This latter compound is treated with carbon dioxide in basic organic medium affording the intermediate tricyclic lactone (VI). This latter lactone is converted to compound (VII) by a sequence of steps involving, firstly, acid treatment to convert the enol ether to the corresponding keto group, secondly, acylation in organic solution to give the triacetoxy or other appropriate triacyloxy derivative thereof, represented by the acyl groups defined as $R^9$, $R^{10}$, and $R^{11}$ above, thirdly, reduction of the restored keto group to the hydroxyl group, fourthly, preparing the corresponding bromo, chloro, or p-toluenesulfonyloxy derivative (represented by $R^{12}$ above) such as by respective treatment with triphenylphosphite dibromide, triphenylphosphite dichloride, or other halogenation agent, and p-toluenesulfonyl chloride, respectively, and, fifthly, mild acid hydrolysis to remove the phenolic acyl groups ($R^9$ and $R^{10}$) leaving the aliphatic chain acyl group intact ($R^{11}$) and, lastly, etherifying the restored phenolic hydroxyl groups such as with dihydropyran in benzene.

The novel reaction whereby compound (VII) is converted to the corresponding lactone (VIII) is conducted with base treatment such as is provided by a mild alkali metal base, for example, sodium bicarbonate, sodium carbonate, potassium bicarbonate, potassium carbonate, and the like, or a strong base, for example, sodium hydroxide, potassium hydroxide, and the like in organic solvent which provides a soluble medium for the base reactant and is inert to the reaction such as methanol, ethanol, dioxane, benzene, ethylene glycol, and the like, preferably at reflux temperatures. The thus prepared lactone is thereafter hydrolyzed with acid thus giving the product 2-(6'-keto-10'-hydroxyundec-1'-enyl)-4,6-dihydroxybenzoic acid-10'-lactone (IX).

The novel intermediate tricyclic lactone represented by Formula VII above in addition to its usefulness as an intermediate as previously indicated in detail can be isolated from the reaction process for use in various biological compositions and syntheses of other organic compounds. These lactones, represented below (VIIa), possess activities similar to those described hereinabove for the product lactones hereof.

A representative group of these novel compounds, by reference to the product compounds of this invention as illustrated by Formula I above, are represented by the following structural formula:

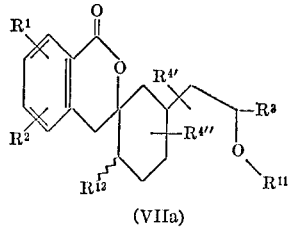

(VIIa)

wherein each of $R^1$, $R^2$, $R^3$, $R^{11}$, and $R^{12}$ is as hereinbefore defined and each of $R^{4'}$ and $R^{4''}$, independent of each other, has the same meaning as the definition of $R^4$ for the compounds of Formula I. Acid hydrolysis of the above compounds give the corresponding derivatives containing the respective hydroxyl groups in lieu of the ether groups present therein. Base hydrolysis removes present acyloxy groups giving the corresponding hydroxy compounds.

The above described procedures of the instant process can be similarly followed in the preparation of the other 2-(6'-keto-10'-hydroxyundec-1'-enyl)-benzoic acid lactones represented by Formula I above utilizing the requisite starting compounds. Thus, for example, by utilizing the methyl benzyl ester as a starting compound in the instant process, 2 - (6' - keto-10'-hydroxyundec-1'-enyl)-benzoic acid-10'-lactone is prepared.

The substituents represented by $R^3$ and $R^4$ are preferably provided by utilizing the appropriately substituted starting compounds. Thus, by employing 4 - tetrahydropyran - 2' - yloxyhexyl lithium and 4 - tetrahydropyran-2' - yloxyheptyl lithiur, or equivalent etherified alkane in the preparation of compound (V), the corresponding compounds in which $R^3$ is ethyl and propyl, are respectively obtained. Similarly, by preparing and utilizing a branch chain etherified alkane in the preparation of compound (V) and/or a substituted glutaric acid ester in the preparation of compound (III), the corresponding compounds containing appropriate $R^4$ ($R^{4'}$, $R^{4''}$) substituents are prepared. In addition, the use of a halogenated benzyl ester starting compound gives the corresponding compounds containing halogen represented by groups $R^1$ and $R^2$. By starting with carbomethoxymethylnaphthalene in lieu of compound (II), the corresponding 4,5-benzo derivative is prepared, that is, the compounds in which $R^1$ and $R^2$, taken together, is 4,5-benzo.

The substituents and functional groupings represented by $R^1$, $R^2$, and $R^5$ in Formula I can be present in the starting compounds as indicated above and are preferably provided at the end of the principal reaction sequence such as by treating compound (IX) with etherification agents to form various 4,6-diethers, for example, methoxy, ethoxy, cyclopentyloxy, tetrahydrofuran - 2' - yloxy, and the like and esterification agents giving various 4,6-diesters, for example, acetoxy, propionoxy, adamantoloxy, and the like.

The $R^5$ substituents in the product compounds are provided by reducing the keto function at position 6' of the molecule to give the corresponding alcohol or treating it with an alkyl-, alkenyl-, alkynyl lithium or alternatively, an alkyl-, alkenyl-, or alkylnyl magnesium halide to provide the corresponding 6'-aliphatic-6'-hydroxy derivatives. The resultant hydroxy group in each instance can be etherified and esterified giving the corresponding ethers and esters thereof. The 6'-keto can be removed such as by converting it to the corresponding 6',6'-thioketal and cleaving this by treatment with Raney nickel, thus giving the 6'-unsubstituted compound. Reduction of the 6'-keto, such as with sodium borohydride, gives the corresponding 6'-alcohol which may be etherified or esterified as described above, or alternatively, treated with p-toluenesulfonyl chloride in pyridine solution followed by treatment of the reaction product thereof with collidine to give a mixture of 5'- and 6'-unsaturated derivatives, which can be separated such as by selective crystallization from ethanol. Treatment of the 6'-keto with sulfur tetrafluoride in dioxane gives the corresponding 6',6'-difluoro compound.

Further, the above mention keto group can be converted to the corresponding oxime, such as by treatment with hydroxylamine hydrochloride; a hydrazone such as with hydrazine itself or a substitued hydrazine, for example, methylhydrazine, phenylhydrazine, 2,4 - dinitrophenylhydrazine, semicarbazide, and the like; an acetal with ethylene glycol, trimethylene glycol, and the like; imines, such as are provided by reaction with methylamine; dimethylamine, ethylamine, aniline, benzylamine, and the like; amines by reduction of the corresponding imine; as well as various other groups known to one skilled in the art. It can also undergo a Beckman rearrangement to give the corresponding lactam.

In addition, certain other modifications can be made to the thus prepared product compound such as selective hydrogenation of one or more unsaturated linkages either in the benzoic acid ring or at position 1', 2' (Z) such as by utilizing a poisoned hydrogenation catalyst.

Illustrative 1,2-benzoic acid lactones of the above skeletal formula which are thus prepared by following one or more of the above outlined procedures using the requisite starting compounds or treatment of the product compound (IX) hereof are as follows:

2-(10'-hydroxyundec-1'-enyl)-4,6-dihydroxybenzoic- acid-10'-lactone, 2-(6',10'-dihydroxyundec-1'-enyl)-4,6-dihydroxybenzoic acid-10'-lactone, 2-(10'-hydroxyundec-1',5'-dienyl)-4,6-dihydroxybenzoic acid-10'-lactone, 2-(10'-hydroxyundec-1',6'-dienyl)-4,6-dihydroxybenzoic acid-10'-lactone, 2-(6'-keto-10'-hydroxyundecanyl)-4,6-dihydroxybenzoic acid-10'-lactone, 2-(6'-keto-10'-hydroxyundec-1'-enyl)-4,6-dimethoxybenzoic acid-10'-lactone, 2-(6'-keto-10'-hydroxyundec-1'-enyl)-4,6-diacetoxybenzoic acid-10'-lactone, 2-(6'-keto-10'-hydroxyundec-1'-enyl)-4,6-biscyclopentyloxybenzoic acid-10'-lactone, 2-(6'-keto-10'-hydroxyundec-1'-enyl)-4,6-bistetrahydropyran-2'-yloxybenzoic acid-10'-lactone, 2-(6'-keto-10'-hydroxyundec-1'-enyl)-4,6-bistetrahydrofuran-2'-yloxybenzoic acid-10'-lactone, 2-(6'-ethynyl-6',10'-dihydroxyundec-1'-enyl)-4,6-dihydroxybenzoic acid-10'-lactone, 2-(6'-methyl-6',10'-dihydroxyundec-1'-enyl)-4,6-dihydroxybenzoic acid-10'-lactone, 2-(6'-ethynyl-6'-tetrahydropyran-2''-yloxy-10'-hydroxyundec-1'-enyl)-4,6-bistetrahydropyran-2'-yloxybenzoic acid-10'-lactone.

2-(6'-acetoxy-6'-ethynyl-10'-hydroxyundec-1'-enyl)-4,6-diacetoxybenzoic acid-10'-lactone, 2-(6'-acetoxy-10'-hydroxyundec-1'-enyl)-4,6-dihydroxybenzoic acid-10'-lactone, 2-(6'-tetrahydropyran-2''-yloxy-10'-hydroxyundec-1'-enyl)-4,6-bistetrahydropyran-2'-yloxybenzoic acid-10'-lactone, 2-(6',6'-difluoro-10'-hydroxyundec-1'-enyl)-4,6-dihydroxybenzoic acid-10'-lactone, and 2-(6',6'-bisethylenedioxy-10'-hydroxyundec-1'-enyl)-4,6-dihydroxybenzoic acid-10'-lactone.

It will be understood that various substituent combinations not included in the above partial list but covered by the scope hereof are similarly prepared in accordance with the above discussion and hereinafter contained examples.

The following examples illustrate the manner by which this invention can be practiced but they should not be construed as limitations upon the overall scope hereof.

EXAMPLE 1

To a refluxing solution of 10 g. of methyl 3,5-dihydroxyphenylacetate in 500 ml. of benzene containing two chemical equivalents of sodium hydride are added three chemical equivalents of benzyl chloride and the resultant solution is refluxed for an additional 15 hours. Thereafter, the reaction mixture is washed with water and dried over sodium sulfate and the product methyl 3,5-bisbenzyloxyphenylacetate is removed by distillation in vacuum.

To a solution of 10 g. of methyl 3,5-bisbenzyloxyphenylacetate and 10 g. of diethylglutarate in 150 ml. of benzene are added two chemical equivalents of sodium hydride and the resultant mixture is stirred for 12 hours at room temperature. One hundred milliliters of methanol containing 3 g. of sodium hydroxide are added and the mixture allowed to stand at room temperature for 1 hour. Water is then added and the mixture is acidified with dilute hydrochloric acid and extracted with successive portions of ether. The ether extracts are dried and the product is removed by distillation under vacuum and recrystallized from acetone:hexane, yielding 1-(2′,6′-diketocyclohexyl)-3,5-bisbenzyloxybenzene.

A solution of 10 g. of 1-(2′,6′-diketocyclohexyl)-3,5-bisbenzyloxybenzene in 100 ml. of ethanol is stirred at room temperature with 1 g. of Raney nickel under a hydrogen atmosphere for two hours. The resultant mixture is filtered and the filtrate evaporated, giving a solid which is recrystallized from ethanol to give 1-(2′,6′-diketocyclohexyl)-3,5-dihydroxybenzene.

A continuous stream of hydrogen chloride gas is passed through a solution of 10 g. of 1-(2′,6′-diketocyclohexyl)-3,5-dihydroxybenzene in 100 ml. of anhydrous methanol for 2 minutes. The solution is then allowed to stand at room temperature for 24 hours. A dilute sodium bicarbonate solution is added to neutrality and the solution extracted with successive portions of ether which are dried over sodium sulfate and evaporated to give 1-(2′-keto-6′-methoxycyclohex-6′-enyl)-3,5-dihydroxybenzene, which is recrystallized from methanol.

To a solution of 3 g. of 1-chloro-4-tetrahydropyran-2′-yloxypentane in 25 ml. of ethyl ether are added 0.1 g. of lithium metal and the mixture is stirred at 0° C. for one-half hour, thus giving the corresponding alkyl lithium compound. To the solution containing the thus prepared compound is added 1 g. of 1-(2′-keto-6′-methoxycyclohex-6′-enyl)-3,5-dihydroxybenzene and the resultant mixture is refluxed for one-half hour. Thereafter, water is added and the mixture extracted with successive portions of ether. The combined ether extracts are evaporated, thus giving 1-[2′-hydroxy-2′-(4-tetrahydropyran-2″-yloxypentyl)-6′-methoxycyclohex-6′-enyl]-3,5-dihydroxybenzene.

A solution comprising 10 g. of 1-[2′-hydroxy-2′-(4-tetrahydropyran-2″ - yloxypentyl)-6′ - methoxycyclohex-6′-enyl]-3,5-dihydroxybenzene, 10 g. of sodium bicarbonate, 50 ml. of water, and 100 ml. of dioxane is stirred at 60° C. for 3 hours under carbon dioxide gas maintained at a pressure of five atmospheres. Thereafter, the mixture is extracted with successive portions of ether and the ether extracts dried under sodium sulfate and evaporated to give 2-[2′-hydroxy - 2′-(4-tetrahydropyran - 2″-yloxypentyl)-6′-methoxycyclohex-6′ - enyl] - 4,6 - dihydroxybenzoic acid-2′-lactone.

To a solution of 1 g. of 2-[2′-hydroxy-2′-(4-tetrahydropyran-2″-yloxypentyl) - 6′ - methoxycyclohex-6′-enyl]-4,6-dihydroxybenzoic acid-2′-lactone in 10 ml. of acetone are added a few drops of 36% hydrochloric acid. The mixture is heated a few minutes at steam bath temperatures, diluted with water and filtered, thus giving a solid product.

A mixture of 1 g. of the solid thus obtained, 4 ml. of pyridine and 2 ml. of acetic anhydride is allowed to stand at room temperature for 15 hours. The mixture is then poured into ice water and the solid which forms is collected by filtration, washed with water and dried to yield 2 - [2′-hydroxy-2′-(4-acetoxypentyl)-6′-ketocyclohexyl] - 4,6-diacetoxybenzoic acid-2′-lactone, which may be further purified through recrystallization from acetone: hexane.

A solution of 1 g. of sodium borohydride in 3 ml. of water is added to an ice-cooled solution of 1 g. of 2-[2′-hydroxy - 2′-(4′acetoxypentyl) - 6′-ketocyclohexyl]-4,6-diacetoxybenzoic acid-2′-lactone in 120 ml. of methanol and the mixture then allowed to stand for 16 hours at room temperature. The excess reagent is decomposed by addition of acetic acid and the solution is then concentrated to small volume in vacuo and diluted with water. The product is extracted with ethyl acetate and these extracts are washed with water, dried and evaporated to yield 2 - [2′ - hydroxy - 2′-(4-acetoxypentyl)-6′-hydroxycyclohexyl] - 4,6 - diacetoxybenzoic acid-2′-lactone which may be further purified by recrystallization from acetone: hexane.

To a mixture of 4 g. of 2-[2′-hydroxy-2′-(4-acetoxypentyl) - 6′ - hydroxyclclohexyl]-4,6 - diacetoxybenzoic acid - 2′-lactone in 30 ml. of anhydrous pyridine are added 4 g. of p-toluenesulfonyl chloride. After standing for 9 hours at room temperature, the solution is diluted with ice, forming an oil. The supernatent liquid is decanted and the residue oil washed with water, twice with dilute hydrochloric and again with water, and dried over sodium sulfate. Recrystallization from acetone gives 2-[2′-hydroxy-2′-(4 - acetoxypentyl) - 6′ - p - toluenesulfonyloxycyclohexyl]-4,6-diacetoxybenzoic acid-2′-lactone.

To a solution of 10 g. of 2-[2′-hydroxy-2′-(4-acetoxypentyl) - 6′ - p - toluenesulfonyloxycyclohexyl] - 4,6-diacetoxybenzoic acid-2′-lactone in 100 ml. of ethanol is added 5 ml. of water and 2 ml. of concentrated hydrochloric acid and the mixture is allowed to stand at room temperature for 12 hours. Thereafter, water is added and the mixture extracted with successive portions of ether, the extracts being dried over sodium sulfate and evaporated to yield 2-[2′-hydroxy-2′-(4-acetoxypentyl)-6′-p-toluenesulfonyloxycyclohexyl] - 4,6 - dihydroxybenzoic acid-2′-lactone.

Five milliliters of dihydropyran are added to a solution of 1 g. of 2-[2′-hydroxy-2′-(4-acetoxypentyl)-6′-p-toluenesulfonyloxycyclohexyl] - 4,6 - dihydroxybenzoic acid-2′-lactone in 15 ml. of benzene. About 1 ml. is removed by distillation to remove moisture and 0.4 g. of p-toluenesulfonic acid is added to the cooled solution. This mixture is allowed to stand at room temperature for 4 days and is then washed with an aqueous sodium carbonate solution and water, dried and evaporated. The residue is chromatographed on neutral alumina, eluting with hexane, to yield 2-[2′-hydroxy-2′-(4-acetoxypentyl)-6′-p-toluenesulfonyloxycyclohexyl] - 4,6 - bistetrahydropyran-2″-yloxybenzoic acid-2′-lactone, which is recrystallized from pentane.

Alternatively, the corresponding 6′-bromo derivative otherwise corresponding to the compound prepared in accordance with the procedure set forth in the tenth paragraph hereof, is prepared as follows.

To a mixture of 1 g. of 2-[2′-hydroxy-2′-(4-acetoxypentyl)-6′-hydroxycyclohexyl]-4,6-diacetoxybenzoic acid-2′-lactone in 30 ml. of anhydrous pyridine is added one chemical equivalent (based upon the amount of starting compound) of triphenylphosphite dibromide and the resultant mixture is heated to 60° C. for 2 hours. Thereafter, water is added and the mixture is extracted with ethyl ether and the extracts dried over sodium sulfate and evaporated to give 2-[2′-hydroxy-2′-(4-acetoxypentyl)-6′-bromocyclohexyl]-4,6-diacetoxybenzoic-acid-2′-lactone.

The product thus obtained is thereafter further treated according to the procedure set forth herein, thus ultimately providing thereby, 2-[2′-hydroxy-2′ - (4-acetoxypentyl)-6′-bromocyclohexyl]-4,6-bistetrahydropyran - 2″-yloxybenzoic acid-2′-lactone through the compound 2-[2′-hydroxy-2′-(4-acetoxypentyl) - 6′ - bromocyclohexyl]-4,6-dihydroxybenzoic acid-2′-lactone.

EXAMPLE 2

To a solution comprising of 10 g. of 2-[2′-hydroxy-2′-(4-acetoxypentyl) - 6′ - p-toluenesulfonyloxycyclohexyl]-4,6-bistetrahydropyran-2″-yloxybenzoic acid - 2′-lactone, 100 ml. of ethanol, 10 ml. of water, and 1 g. of sodium bicarbonate is refluxed for 30 minutes. Thereafter, water is added and the mixture is extracted with ether portions which are dried and evaporated to yield 2-(6′-keto-10′-hydroxyundec-1′-enyl)-4,6-bistetrahydropyran-2′ - yloxybenzoic acid-10′-lactone.

To a solution of 1 g. of 2-(6′-keto-10′-hydroxyundec-1′ - enyl) - 4,6 - bistetrahydropyran - 2′ - yloxybenzoic acid-10′-lactone in 30 ml. of acetic acid is added 0.5 ml. of 2 N hydrochloric acid. The mixture is allowed to stand 5 hours at room temperature and then diluted with ice water and extracted with methylene chloride. The extracts are washed with water to neutrality, dried over sodium sulfate and evaporated to dryness to yield 2-(6'-keto-10'-hydroxyundec-1'-enyl) - 4,6 - dihydroxybenzoic acid-10'-lactone, which is recrystallized from acetone: hexane.

EXAMPLE 3

By substituting 1 - chloro-4-tetrahydropyran-2'-yloxyhexane and 1 - chloro-4-tetrahydropyran-2'-yloxyheptane for 1-chloro-4-tetrahydropyran - 2'-yloxypentane in the procedure set forth in the fifth paragraph in Example 1, there are respectively obtained via the procedures terminating in Example 2 above, 2-(6'-keto-10'-hydroxydodec-1'-enyl) - 4,6 - dihydroxybenzoic acid - 10'-lactone and 2-(6'-keto-10'-hydroxytridec-1' - enyl)-4,6-dihydroxybenzoic acid-10'-lactone. Similarly, there are respectively obtained thereby as products of Example 1, 2-[2'-hydroxy-2'-(4-acetoxyhexyl)-6'-p - toluenesulfonyloxycyclohexyl] - 4,6 - bistetrahydropyran - 2''' - yloxybenzoic acid - 2' - lactone, and 2 - [2' - hydroxy - 2' - (4-acetoxyheptyl)-6'-p-toluenesulfonyloxycyclohexyl] - 4,6-bistetrahydropyran-2'''-yloxybenzoic acid-2'-lactone.

By starting with carbomethoxymethylnaphthylene as a starting compound in Example 1, there is obtained as a product thereof, 2-[2'-hydroxy-2'-(4-acetoxypentyl)-6'-p-toluenesulfonyloxycyclohexyl]4,5-benzobenzoic acid - 2'- lactone and as a product of Example 2 above, 2-('keto-10'-hydroxyundec - 1' - enyl) - 4,5 - benzobenzoic acid-10'-lactone. Similarly, by utilizing methyl benzyl ester as the starting compound in Example 1, there is obtained as a product thereof, 2-[2'-hydroxy-2'-(4-acetoxypentyl)-6'-p-toluenesulfonyloxycyclohexyl]-benzoic acid - 2'-lactone, and as a product of Example 2 thereof, 2-(6'-keto-10'-hydroxyundec-1'-enyl)-benzoic acid-10'-lactone.

EXAMPLE 4

To a suspension of 1 g. of 2-(6'-keto-10'-hydroxyundec-1'-enyl) - 4,6 - dihydroxybenzoic acid - 10'-lactone in 25 ml. of acetone is added a solution of 0.5 g. of potassium hydroxide in 37.5 ml. of water and the stirred mixture is heated dropwise with 10 ml. of methyl sulfate. The mixture is stirred for an additional 45 minutes and then poured itno dilute hydrochloric acid. The solid which forms is collected by filtration and dried to yield 2-(6'-keto-10'-hydroxyundec-1'-enyl) - 4,6 - dimethoxybenzoic acid-10'-lactone which is recrystallized from chloroform: methanol.

The following procedures illustrate methods by which various ester and ether groups may be inserted on the benzoic acid ring.

A mixture of 1 g. of 2-(6'-keto-10'-hydroxyundec-1'-enyl)-4,6-dihydroxybenzoic acid-10'-lactone, 1 g. of p-toluenesulfonic acid monohydrate, 75 ml. of acetic acid and 50 ml. of acetic anhydride is allowed to stand at room temperature for 24 hours, and then poured into water and stirred. This mixture is then extracted with methylene chloride and these extracts are dried and evaporated to yield 2-(6'-keton-10'-hydroxyundec-1'-enyl)-4,6-diacetoxybenzoic acid-10'-lactone which is recrystallized from acetone:ether.

Similarly, the corresponding 4,6-propionoxy derivative is prepared upon substitution of propionic anhydride for acetic anhydride in the above procedure.

A mixture of 1 g. of 2-(6'-keto-10'-hydroxyundec-1'-enyl)-4,6-dihydroxybenzoic acid-10'-lactone in 8 ml. of pyridine and 5 ml. of adamantoyl chloride is heated at steam bath temperatures for one hour. The mixture is then poured into ice water and the solid which forms is collected by filtration, washed with water and dried to yield 2-(6' - keto-10' - hydroxyundec - 1' - enyl) - 4,6-bisadamantoyloxybenzoic acid-10' - lactone which is further purified through recrystallization from methylene chloride:hexane.

Five milliliters of dihydropyran are added to a solution of 1 g. of 2-(6'-keto-10'-hydroxyundec-1'-enyl)-4,6-dihydroxybenzoic acid-10'-lactone in 15 ml. of benzene. About 1 ml. is removed by distillation to remove moisture and 0.4 g. of p-toluenesulfonyl chloride is added to the cooled solution. This mixture is allowed to stand at room temperature for four days, and is then washed with aqueous sodium carbonate solution and water, dried and evaporated. The residue is chromatographed on neutral alumina, eluting with hexane, to yield 2-(6'-keto-10'-hydroxyundec - 1'-enyl) - 4,6-bistetrahydropyran - 2'-yloxybenzoic acid-10'-lactone which is recrystallized from pentane.

To a solution of 1 g. of 2-(6'-keto-10'-hydroxyundec-1'-enyl)-4,6-dihydroxybenzoic acid-10'-lactone in 20 ml. of benzene, 20 ml. of dihydrofuran is added. Five milliliters is distilled off to remove moisture, and the mixture is allowed to cool to room temperature. To the cooled mixture, 0.2 g. of freshly purified p-toluenesulfonyl chloride is added. The mixture is stirred at room temperature for 24 hours and then poured into an excess of 5% aqueous sodium bicarbonate solution. The product is extracted with ethyl acetate, the organic solution is washed with water to neutrality, dried over anhydrous magnesium sulfate, and evaporated to dryness under reduced pressure. The oily residue crystallizes on the addition of ether to yield the 2-(6'-keto-10'-hydroxyundec - 1'-enyl)-4,6-bistetrahydrofuran-2'-yloxybenzoic acid-10'-lactone.

A solution of 5 g. (0.016 mole) of 2-(6'-keto-10'-hydroxyundec - 1'-enyl) - 4,6-dihydroxybenzoic acid - 10'-lactone in 50 ml. of benzene is heated to reflux and about 2 ml. removed by distillation to eliminate the presence of moisture. The mixture is cooled to room temperature and then two chemical equivalents of sodium hydride is added followed by the dropwise addition of two chemical equivalents of cyclopentyl bromide in 20 ml. of benzene over a period of 20 minutes. The mixture is allowed to reflux for 20 hours after which time the precipitate of sodium bromide is removed by filtration and the organic phase is dried and evaporated to yield 2-(6'-keto - 10' - hydroxyundec - 1' - enyl) - 4,6 - biscyclopentyloxybenzoic acid - 10' - lactone which is recrystallized from acetone:hexane.

EXAMPLE 5

A solution of 2.0 g. of 2-(6'-keto-10'-hydroxyundec-1'-enyl)-4,6-dihydroxybenzoic acid-10'-lactone in 100 ml. of ethyl acetate is hydrogenated with 0.1 g. of palladium-on-carbon catalyst until the theoretical amount of hydrogen is consumed. The catalyst is removed by filtration and the filtrate is evaporated to dryness to yield 2-(6'-keto - 10'-hydroxyundecanyl)-4,6-dihydroxybenzoic acid-10'-lactone which may be further purified by recrystallization from acetone:hexane.

EXAMPLE 6

A solution of 1 g. of sodium borohydride in 3 ml. of water is added to an ice-cooled solution of 1 g. of 2-(6'-keto - 10'-hydroxyundec - 1'-enyl)-4,6-dihydroxybenzoic acid-10'-lactone in 120 ml. of methanol and the mixture then allowed to stand for 16 hours at room temperature. The excess reagent is decomposed by addition of acetic acid and the solution is then concentrated to small volume in vacuo and diluted with water. The product is extracted with ethyl acetate and these extracts are washed with water, dried and evaporated to yield 2-(6',10'-dihydroxyundec - 1'-enyl) - 4,6-dihydroxybenzoic acid-10'-lactone which may be further purified by recrystallization from acetone:hexane.

The thus provided 6'-hydroxyl group is etherified and esterified as described above in Example 4 to give the corresponding 6'-ethers and -esters.

EXAMPLE 7

A solution of 5 g. of 2-(6'-keto-10'-hydroxyundec-1'-enyl)-4,6-dihydroxybenzoic acid-10'-lactone in 250 ml. of thiophene-free benzene is treated with an ethereal solution of three chemical equivalents (based upon the amount of lactone) of methylmagnesium bromide. The mixture is heated at reflux under anhydrous conditions for 3 hours, cooled, and cautiously treated with excess aqueous ammonium chloride solution. This mixture is then extracted with ethyl acetate and these extracts are in turn washed with water, dried over sodium sulfate and evaporated to dryness to yield 2-(6'-methyl-6',10'-dihydroxyundec - 1'-enyl) - 4,6-dihydroxybenzoic acid - 10'-lactone which is recrystallized from methylene chloride: hexane.

To a stirred solution of 2 g. of 2-(6'-keto-10'-hydroxyundec-1'-enyl)-4,6-dihydroxybenzoic acid - 10'-lactone in 250 ml. of absolute ether is added in a dropwise fashion and under nitrogen, an ethereal solution of three chemical equivalents (based upon the amount of lactone) of ethyl lithium. The mixture is then stirred for 48 hours at room temperature, poured into water, acidified with hydrochloric acid and stirred vigorously for one hour. The ethereal phase is separated, washed with water too neutrality, dried over sodium sulfate and evaporated to dryness to yield 2-(6'-ethyl - 6',10'-dihydroxyundec-1'-enyl)-4,6-dihydroxybenzoic acid - 10'-lactone which is further purified through recrystallization from acetone: hexane.

To a solution of 1 g. of lithium aluminum hydride in 100 ml. of anhydrous tetrahydrofuran is continuously bubbled a slow current of purified acetylene. Thereafter, 1 g. of 2-(6'-keto - 10'-hydroxyundec - 1'-enyl)-4,6-dihydroxybenzoic acid - 10'-lactone in 10 ml. of tetrahydrofuran is added and the reaction mixture stirred at room temperature for 4 hours. Eight milliliters of water are then added and the mixture stirred for 30 minutes. The mixture is then filtered and the organic filtrate evaporated to yield 2-(6'-ethynyl - 6',10'-dihydroxyundec-1'-enyl)-4,6-dihydroxybenzoic acid - 10'-lactone which is recrystallized from acetone:hexane.

The 6'-hydroxyl groups which are provided via the procedures set forth in this example above are esterified and etherified in a similar manner as described in Example 6 above thus giving the following representative compounds thereof:

2-(6'-ethynyl-6'-tetrahydropyran - 2''-yloxy-10'-hydroxyundec-1'-enyl)-4,6-bistetrahydropyran - 2'-yloxybenzoic acid - 10'-lactone, 2-(6'-acetoxy - 6'-ethynyl - 10'-hydroxyundec-1'-enyl)-4,6-acetoxybenzoic acid-10'-lactone, 2-(6'-propionoxy - 6'-methyl-10'-hydroxyundec-1'-enyl)-4,6-propionoxybenzoic acid-10'-lactone, and 2-(6'-propionoxy - 6'-ethyl-10'-hydroxyundec - 1'-enyl)-4,6-propionoxybenzoic acid-10'-lactone.

Similarly, by treating a 4,6-diesterified or 4,6-dietherified compound as described in the instant example, there are obtained, for example, 2-(6'-ethynyl-6'-tetrahydropyran-2''-yloxy-10'-hydroxyundec-1'-enyl) - 4,6 - diacetoxybenzoic acid-10'-lactone and 2-(6'-methyl-6'-propionoxy-10'-hydroxyundec-1'-enyl)-4,6-bistetrahydropyran - 2'-yloxybenzoic acid-10'-lactone.

EXAMPLE 8

A mixture of 1 g. of 2-(6'-keto-10'-dihydroxyundec-1'-enyl)-4,6-dihydroxybenzoic acid-10'-lactone in 50 ml. of warm acetic acid is treated with 1 ml. of ethanedithiol in a solution of 1 g. of p-toluenesulfonic acid in 10 ml. of acetic acid. The mixture is kept at room temperature for 17 hours after which time a crystalline solid separates. This solid is recrystallized from acetone to give 2-(6',6'-ethanedithio-10'-hydroxyundec-10'-enyl) - 4,6-dihydroxybenzoic acid-10'-lactone.

Twenty grams of standard Raney nickel catalyst is refluxed with stirring for 2 hours in 60 ml. of acetone. A solution of 2 g. of 2-(6',6'-ethanedithio-10'-hydroxyundec-1'-enyl)-4,6-dihydroxybenzoic acid-10'-lactone in 40 ml. of acetone and 40 ml. of water is added and the refluxing is continued for one hour. The reaction mixture is filtered and the filtrate concentrated in vacuum and extracted with ether. The ethereal layer is successively washed with 100 ml. of cold 1% sodium hydroxide, 100 ml. of 1 N hydrochloric acid, and finally, 300 ml. of water, dried over sodium sulfate and evaporated to dryness to give 2-(10'-hydroxyundec-1'-enyl) - 4,6 - dihydroxybenzoic acid-10'-lactone.

EXAMPLE 9

A solution of 1 g. of 2-(6',10'-dihydroxyundec-1'-enyl)-4,6-dihydroxybenzoic acid-10'-lactone in 7 ml. of dry pyridine is cooled to 10° C. and treated with 0.4 ml. of thionyl chloride. The mixture is allowed to stand for four minutes at this temperature and then diluted with ice water. The solid which forms is collected by filtration, washed with water and dried. The solid thus obtained is refluxed in 10 ml. of collidine for 2 hours, cooled to room temperature, and diluted with a water-ether mixture. The ether layer is washed and dried and evaporated to give a mixture of 2-(10'-hydroxyundec-1',5'-dienyl) - 4,6 - dihydroxybenzoic acid-10'-lactone and 2-(10'-hydroxyundec-1',6'-dienyl)-4,6-dihydroxybenzoic acid-10'-lactone which are separated by selective crystallization from ethanol.

EXAMPLE 10

A solution of 0.5 g. of 2-(6'-keto-10'-hydroxyundec-1'-enyl)-4,6-dihydroxybenzoic acid-10'-lactone in 25 ml. of dioxane is treated at —70° C. with 2 molar equivalents of sulfur tetrafluoride. The reaction vessel is sealed and the temperature permitted to attain 20° C. After being allowed to stand 20 hours, the reaction mixture is cooled, poured carefully into ice water, treated with an excess of sodium bicarbonate, and extracted with methylene chloride. The extract is washed with water to neutrality, dried and evaporated to dryness. The residue is chromatographed on alumina to yield 2-(6',6'-difluoro-10'-hydroxyundec-1'-enyl)-4,6-dihydroxybenzoic acid-10'-lactone which is recrystallized from acetone:hexane.

EXAMPLE 11

To a solution comprising of 10 g. of 2-[2'-hydroxy-2'-(4-acetoxypentyl) - 6' - p-toluenesulfonyloxycyclohexyl]-4,6-bistetrahydropyran-2''-yloxybenzoic acid-2' - lactone, 100 ml. of ethanol, 10 ml. of water, and 1 g. of sodium bicarbonate is refluxed for 30 minutes. Thereafter, water is added and the mixture is extracted with ether portions which are dried and evaporated to yield 2-[2'-hydroxy-2'-(4-acetoxypentyl)-6' - p - toluenesulfonyloxycyclohexyl]-4,6-dihydroxybenzoic acid-2'-lactone.

Similarly, 2-[2'-hydroxy-2'-(4-acetoxypentyl)-6'-bromocyclohexyl]-4,6-bistetrahydropyran-2''-yloxybenzoic acid-2'-lactone is converted to 2-[2'-hydroxy-2'-(4-acetoxypentyl)-6'-bromocyclohexyl]-4,6 - dihydroxybenzoic acid-2'-lactone.

These latter compounds are esterified as set forth in Example 4 hereof, giving the corresponding 4,6-diesters thereof, or it is etherified as also set forth in Example 4 hereof, giving the other corresponding 4,6-diethers.

What is claimed is:

1. A process for the preparation of 2-[6'-keto-10'-hydroxyalk - 1' - enyl] - 4,6 - bistetrahydropyran - 2' - yloxy benzoic acid-10'-lactone of the formula:

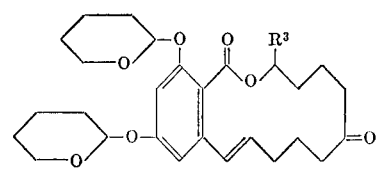

wherein R³ is hydrogen or (lower) alkyl; which comprises:

(a) condensing a 3,5-bisbenzyloxy phenyl acetate ester with a glutaric acid ester in the presence of two chemical equivalents of sodium hydride, and then treating the resulting condensed product with base

13 to give 1-[2',6'-diketocyclohexyl]-3,5-bisbenzyloxy benzene;

(b) hydrogenating the thus prepared 1-[2',6'-diketocyclohexyl]-3,5-bisbenzyloxy benzene with hydrogen in the presence of a nickel catalyst to give 1-[2',6'-diketocyclohexyl]-3,5-dihydroxy benzene;

(c) treating the thus prepared 1-[2',6'-diketocyclohexyl]-3,5-dihydroxy benzene with acid in an anhydrous alkanol to give the corresponding 1-[2'-keto - 6' - alkoxycyclohex - 6' - enyl]-3,5-dihydroxy benzene;

(d) refluxing the thus prepared 1-[2'-keto-6'-alkoxycyclohex - 6'-enyl]-3,5-dihydroxy benzene with 4-tetrahydropyran-2'-yloxyalkyl alkali metal in an ether to give the corresponding 1-[2'-hydroxy-2'-(4-tetrahydropyran - 2'' - yloxyalkyl)-6'-alkoxycyclohex-6'-enyl]-3,5-dihydroxy benzene;

(e) treating the thus prepared 1-[2'-hydroxy-2'-(4-tetrahydropyran - 2''-yloxyalkyl)-6'-alkoxycyclohex-6'-enyl]-3,5-dihydroxy benzene with carbon dioxide in a basic organic medium to give the corresponding 2 - [2' - hydroxy - 2' - (4-tetrahydropyran-2'''-yloxyalkyl)-6'-alkoxycyclohex-6'-enyl]-4,6-dihydroxy benzoic acid-2'-lactone;

(f) hydrolyzing the thus prepared 2-[2'-hydroxy-2'-(4-tetrahydropyran - 2''' - yloxyalkyl) - 6' - alkoxycyclohex - 6'-enyl]-4,6-dihydroxy benzoic acid-2'-lactone with acid to give the corresponding 2-[2'-hydroxy-2' - (4 - hydroxyalkyl) - 6' - ketocyclohexyl]-4,6-dihydroxy benzoic acid-2'-lactone;

(g) acylating the thus prepared 2-[2'-hydroxy-2'-(4-hydroxyalkyl)-6'-ketocyclohexyl]-4,6-dihydroxy benzoic acid-2'-lactone with a carboxylic acid anhydride in pyridine to give the corresponding 2-[2'-hydroxy-2' - (4 - acyloxyalkyl) - 6' - ketocyclohexyl] - 4,6 - diacyloxy benzoic acid-2'-lactone;

(h) reducing the thus prepared 2-[2'-hydroxy-2'-(4-acyloxyalkyl)-6'-ketocyclohexyl]-4,6-diacyloxy benzoic acid-2'-lactone with sodium borohydride to give the corresponding 2-[2'-hydroxy-2' - (4 - acyloxyalkyl) - 6' - hydroxycyclohexyl] - 4,6 - diacyloxy benzoic acid-2'-lactone;

(i) treating the thus prepared 2-[2'-hydroxy-2'-(4-acyloxyalkyl) - 6'-hydroxycyclohexyl]-4,6-diacyloxy benzoic acid-2'-lactone with p-toluenesulfonyl chloride to give the corresponding 2-[2'-hydroxy-2'-(4-acyloxyalkyl) - 6' - p-toluenesulfonyloxycyclohexyl]-4,6-diacyloxy benzoic acid-2'-lactone;

(j) hydrolyzing the thus prepared 2-[2'-hydroxy-2'-(4 - acyloxyalkyl) - 6' - p - toluenesulfonyloxycyclohexyl] - 4,6-diacyloxy benzoic acid-2'-lactone with acid to give the corresponding 2-[2'-hydroxy-2'-(4-acyloxyalkyl) - 6' - p-toluenesulfonyloxycyclohexyl]-4,6-dihydroxy benzoic acid-2'-lactone;

(k) etherifying the thus prepared 2-[2'-hydroxy-2'-(4-acyloxyalkyl - 6' - p - toluenesulfonyloxycyclohexyl]-4,6-dihydroxy benzoic acid-2'-lactone with dihydropyran in the presence of an acid catalyst to give the corresponding 2 - [2'-hydroxy-2'-(4-acyloxyalkyl)-6' - p - toluenesulfonyloxycyclohexyl] - 4,6-bistetrahydropyran-2''-yloxy benzoic acid-2'-lactone;

(l) treating the thus prepared 2 - [2'-hydroxy-2'-(4-acyloxyalkyl) - 6' - p-toluenesulfonyloxycyclohexyl]-4,6 - bistetrahydropyran - 2''-yloxy benzoic acid-2'-lactone with base in an inert, organic solvent to give the corresponding 2 - [6' - keto-10'-hydroxyalk-1'-enyl]-4,6-bistetrahydropyran-2'-yloxy benzoic acid-10'-lactone.

2. The process according to claim 1 wherein R³ is methyl;

in step (c) the alcohol is methanol, and the 1-[2'-keto-6' - alkoxycyclohex - 6' - enyl]-3,5-dihydroxy benzene is 1-[2'-keto-6'-methoxycyclohex-6'-enyl]-3,5-dihydroxy benzene;

in step (d) the 4-tetrahydropyran-2'-yloxyalkyl alkali metal is 4-tetrahydropyran-2'-yloxypentyl lithium, and the 1 - [2' - hydroxy-2'-(4-tetrahydropyran-2''-yloxyalkyl) - 6' - alkoxycyclohex - 6'-enyl]-3,5-dihydroxy benzene is 1 - [2'-hydroxy-2'-(4-tetrahydropyran - 2'' - yloxypentyl) - 6' - methoxycyclohex-6'-enyl]-3,5-dihydroxy benzene;

in step (e) the 2-[2'-hydroxy-2'-(4-tetrahydropyran-2'' - yloxyalkyl) - 6'-alkoxycyclohex-6'-enyl]-4,6-dihydroxy benzoic acid 2'-lactone is 2-[2'-hydroxy-2'-4 - tetrahydropyran - 2'-yloxypentyl)-6'-methoxycyclohex - 6'-enyl]-4,6-dihydroxy benzoic acid-2'-lactone;

in step (f) the 2-[2'-hydroxy-2'-(4-hydroxyalkyl)-6'-ketocyclohex]-4,6-dihydroxy benzoic acid-2'-lactone is 2-[2'-hydroxy-2'-(4-hydroxypentyl)-6' - ketocyclohexyl]-4,6-dihydroxy benzoic acid-2'lactone;

in step (g) the carboxylic acid anhydride is acetic anhydride, and the 2-[2'-hydroxy-2'-(4-acyloxyalkyl)-6'-ketocyclohexyl]-4,6-diacyloxy benzoic acid-2'-lactone is 2-[2'-hydroxy-2'-(4-acetoxypentyl)-6'-ketocyclohexyl]-4,6-diacetoxy benzoic acid-2'-lactone;

in step (h) 2-[2'-hydroxy-2'-(4-acyloxyalkyl)-6'-hydroxycyclohexyl]-4,6-diacyloxy benzoic acid-2'-lactone is 2 - [2'-hydroxy-2'-(4-acetoxypentyl)-6'-hydroxycyclohexyl]-4,6-diacetoxy benzoic acid-2'-lactone;

in step (i) the 2-[2'-hydroxy-2'-(4-acyloxyalkyl)-6'-p-toluenesulfonyloxycyclohexyl]-4,6 - diacyloxy benzoic acid-2'-lactone is 2-[2'-hydroxy-2'-(4-acetoxypentyl) - 6' - p-toluenesulfonyloxycyclohexyl]-4,6-diacetoxy benzoic acid-2'-lactone;

in step (j) the 2-[2'-hydroxy-2'-(4-acyloxyalkyl)-6'-p-toluenesulfonyloxycyclohexyl]-4,6-dihydroxy benzoic acid-2'-lactone is 2-[2'-hydroxy-2'-(4-acetoxypenyl) - 6' - p-toluenesulfonyloxycyclohexyl]-4,6-dihydroxy benzoic acid-2'-lactone;

in step (k) the 2-[2'-hydroxy-2'-(4-acyloxyalkyl)-6'-p-toluenesulfonyloxycyclohexyl]-4,6 - distetrahydropyran-2''-yloxy benzoic acid-2'-lactone is 2-[2'-hydroxy - 2'-(4-acetoxypentyl)-6'-p-toluenesulfonyloxycyclohexyl]-4,6-bistetrahydropyran-2''-yloxy benzoic acid-2'-lactone;

in step (l) the 2-[6'-keto-10'-hydroxyalkyl-1'-enyl]-4,6-bistetrahydropyran-2'-yloxy benzoic acid-10'-lactone is 2-[6'-keto-10'-hydroxyundec-1'-enyl]-4,6-bistetrahydropyran-2'-yloxy benzoic acid-10'-lactone.

3. The process according to claim 2 wherein in step (l) 2 - [2'-hydroxy-2'-(4-acetoxypentyl)-6'-p-toluenesulfonyloxycyclohex] - 4,6-bistetrahydropyran-2''-yloxy benzoic acid-2'-lactone is treated with a base selected from the group consisting of sodium bicarbonate, potassium bicarbonate, sodium carbonate, potassium carbonate, sodium hydroxide and potassium hydroxide in an inert, organic solvent to give 2-[6'-keto-10'-hydroxyundec-1'-enyl] - 4,6-bistetrahydropyran-2'-yloxy benzoic acid-10'-lactone.

4. The process which comprises treating a 2-[2'-hydroxy - 2' - (4-alkoxyalkyl)-6'-R¹²-cyclohexyl]4-R²-6-R¹-benzoic acid-2'-lactone;

wherein each of R¹ (at position C–6) and R², independent of each other, is hydrogen, alkoxy, halo, cyclopentyloxy, tetrahydrofuran-2'-yloxy, tetrahydropyran-2'-yloxy, or hydrocarbon carboxylic acyloxy of less than 12 carbon atoms; and R¹² is bromo, chloro, or p-toluenesulfonyloxy;

with base in an inert, organic solvent to give the corresponding 2 - [6'-keto-10'-hydroxyalk-1'-enyl]-4-R²-6-R¹-benzoic acid-10'-lactone.

5. The process according to claim 4 wherein the base is selected from the group consisting of sodium bicarbonate, sodium carbonate, potassium bicarbonate, potassium carbonate, sodium hydroxide, and potassium hydroxide.

6. The process according to claim 4 wherein alk-1'-enyl is undec-1'-enyl;

R¹ and R² are tetrahydropyran-2'-yloxy;
R¹² is p-toluenesulfonyloxy; and
the base is sodium bicarbonate.

7. The process according to claim 4 wherein alk-1'-enyl is undec-1'-enyl;
R¹ and R² are methoxy;
R¹² is p-toluenesulfonyloxy; and
the base is sodium bicarbonate.

8. The process of claim 7 including hydrolyzing the 2-(6'-keto-10'-hydroxyundec-1'-enyl)-4,6-dimethoxy benzoic acid-10'-lactone with acid to give the corresponding 2-(6'-keto-10'-hydroxyundec-1'-enyl)-4,6-dihydroxy benzoic acid-10'-lactone.

9. A compound of the formula:

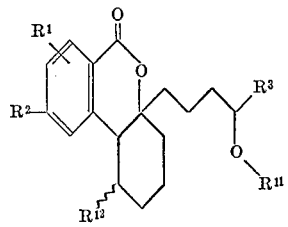

wherein
each of R¹ (at position C-6) and R² is hydrogen, hydroxy, alkoxy, halo, cyclopentyloxy, tetrahydrofuran-2'-yloxy, tetrahydropyran-2'-yloxy, hydrocarbon carboxylic acyl or acyloxy of less than 12 carbon atoms, or R¹ (at position C-5 and R² when taken together are 4,5-benzo, R³ is hydrogen or (lower)alkyl,
R¹¹ is hydrocarbon carboxylic acyl containing less than 12 carbon atoms, and
R¹² is bromo, chloro, or p-toluenesulfonyloxy.

10. The compound of claim 9 wherein each of R¹ and R² is hydrogen, hydroxy, lower alkoxy, cyclopentyloxy, tetrahydrofuran-2'-yloxy, tetrahydropran-2'-yloxy, or hydrocarbon carboxylic acyloxy of less than 12 carbon atoms.

11. The compound of claim 10 wherein each of R¹ and R² is methoxy; R³ is methyl, R¹¹ is acetyl, and R¹³ is p-toluenesulfonyloxy.

12. The compound of claim 10 wherein each of R¹ and R² is tetrahydropyran-2-yloxy, R³ is methyl, R¹¹ is acetyl, and R¹² is p-toluenesulfonyloxy.

13. The compound of claim 10 wherein each of R¹ and R² is hydroxy, R³ is methyl, R¹¹ is acetyl, and R¹² is p-toluenesulfonyloxy.

14. The compound of claim 10 wherein each of R¹ and R² is hydroxy, R³ is methyl, R¹¹ is acetyl, and R¹² is bromo.

References Cited
UNITED STATES PATENTS 3,373,036   3/1968   Hodge et al. _____ 260—343.2

JAMES A. PATTEN, Primary Examiner

U.S. Cl. X.R.

260—327, 338, 340.7, 340.9, 345.9, 473, 590, 999